United States Patent
Ono et al.

[11] Patent Number: 6,060,158
[45] Date of Patent: *May 9, 2000

[54] FLUORO-CARBON RESINOUS LAMINATE HAVING A CRACK-RESISTANT SURFACE AND METHOD OF PRODUCING SAID LAMINATE

[75] Inventors: Kazuhiro Ono; Eiichiro Kuribayashi; Kosuke Kataoka; Kiyokazu Akahori, all of Otsu, Japan

[73] Assignee: Kaneka Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/725,898

[22] Filed: Oct. 4, 1996

[30] Foreign Application Priority Data

Oct. 4, 1995 [JP] Japan .................................. 7-257893

[51] Int. Cl.⁷ ..................... B32B 27/06; B32B 27/08; B32B 31/12; B32B 31/26

[52] U.S. Cl. ..................... 428/339; 428/421; 428/422; 428/473.5; 427/541; 427/542; 427/58; 427/189; 427/195; 427/385.5; 427/393.5

[58] Field of Search ...................... 428/421, 422, 428/473.5, 339; 523/408; 427/541, 542, 58, 189, 195, 385.5, 393, 5

[56] References Cited

U.S. PATENT DOCUMENTS

| | | | |
|---|---|---|---|
| 4,335,030 | 6/1982 | Concannon | 523/408 |
| 4,335,238 | 6/1982 | Moore et al. | 526/254 |
| 4,393,119 | 7/1983 | Concannon | 428/413 |
| 4,628,003 | 12/1986 | Katz | 428/377 |
| 4,801,506 | 1/1989 | Motonari et al. | 428/421 |
| 5,006,411 | 4/1991 | Motonari et al. | 428/421 |
| 5,106,673 | 4/1992 | Effenberger et al. | 428/216 |
| 5,349,003 | 9/1994 | Kato et al. | 524/458 |
| 5,464,897 | 11/1995 | Das et al. | 524/458 |
| 5,502,097 | 3/1996 | Saito | 524/389 |
| 5,576,381 | 11/1996 | Bladel et al. | 524/544 |

*Primary Examiner*—Vivian Chen
*Attorney, Agent, or Firm*—Pillsbury Madison & Sutro LLP

[57] ABSTRACT

A fluoro-carbon resinous laminate has a crack-resistant surface on a fluoro-carbon resinous layer thereof produced by coating a single surface or both surfaces of a plastic film with a single layer of a fluoro-carbon resinous dispersion, and a method of producing the laminate. To produce the fluoro-carbon resinous laminate, which is a minimum of 10 μm in thickness, a single surface or both surfaces of a plastic film are coating with a single layer of concentration-adjusted fluoro-carbon resinous dispersion and then dried, followed by curing the resinous dispersion in a thermal treating furnace with heated atmospheric air or by adding organic solvent to the resinous dispersion, the enabling production of a fluoro-carbon resinous laminate having a surface appearance in which cracks cannot visually be identified.

8 Claims, 1 Drawing Sheet

FLUORO-CARBON RESINOUS LAMINATE HAVING A CRACK-RESISTANT SURFACE AND METHOD OF PRODUCING SAID LAMINATE

BACKGROUND OF THE INVENTION

The present invention relates to a novel fluoro-carbon resinous laminate and a method of producing said laminate. More particularly, the invention relates to a fluoro-carbon resinous laminate comprising a plastic film having single surface or both surfaces coated with fluoro-carbon resinous layers and a method of producing said fluoro-carbon resinous laminate.

Conventional fluoro-carbon resinous laminate comprising layers of fluoro-carbon resin laminated on single surface or both surfaces of a plastic film is mainly wound on a conductor such as copper in taped form and used for motor coils, cables, or electric wires in an aircraft. There are a variety of laminates according to combination of plastic films and fluoro-carbon resinous layers having a variety of thickness. For example, such a laminate comprising a 25 $\mu$m thick plastic film having layers of fluoro-carbon resin having 2.5 $\mu$m through 25 $\mu$m thickness laminated on single surface or both surfaces thereof has mainly been used.

Normally, such a conventional fluoro-carbon resinous laminate comprising a plastic film having single surface or both surfaces laminated with fluoro-carbon resinous layer has been produced via a method of producing fluoro-carbon resinous laminate by laminating a fluoro-carbon resinous film (sheet) with a plastic film or a method comprising a step of coating a plastic film with fluoro-carbon resinous dispersion (coating solution), a step of drying it, and thereafter a step of hardening via curing the dried resinous layers.

In the case of producing fluoro-carbon resinous laminate having a thickness of less than 10 $\mu$m, for example, having 2.5 $\mu$m of thickness, normally, the method of coating a plastic film with fluoro-carbon resinous dispersion (coating solution) has been used.

However, when executing the above coating method, it is necessary to devise the coating method to entail production process technical difficulty.

Moreover, even though coating process became practicable via a devised art, there was still a critical problem to be solved in that noticeable cracks were generated on the surface of fluoro-carbon resinous layers. This symptom was quite noticeable whenever laminating thick fluoro-carbon resinous layers such as the one having a minimum of 10 $\mu$m of thickness for example.

Moreover, in the case of thermally sealing taped laminate containing cracks after winding it onto a conductor, cracks cause void to be generated to easily lead to generation of electrical discharge to raise a problem in terms of electrical insulation characteristic.

Due to the above problem, it is proved in general that fluoro-carbon resinous laminate produced by the lamination of fluoro-carbon resinous film generates better quality than the one generated by applying the coating method.

Nevertheless, in the case of producing fluoro-carbon resinous laminate by applying the lamination method, since fluoro-carbon resinous film costs higher than dispersion, and yet, due to complicated steps taken to prevent cracks from being generated during lamination process, the lamination method has such a problem as to entail higher production cost than the coating method.

Thus, in order to solve the above problems and provide a novel fluoro-carbon resinous laminate and a method of producing said laminate produced by coating single surface or both surfaces of a plastic film with fluoro-carbon resinous dispersion without raising a problem on appearance, inventors have strenuously followed up studies and experiments and eventually achieved the present invention.

BRIEF SUMMARY

A fluoro-carbon resinous laminate of improved surface property which is having a crack-resistant surface on a fluoro-carbon resinous layer thereof, according to the present invention comprises a plastic film and fluoro-carbon resinous layer formed on single surface or both surfaces of said film by way of coating it (them) with fluoro-carbon resinous dispersion.

Another fluoro-carbon resinous laminate of the improved surface property according to the present invention comprises a plastic film and fluoro-carbon resinous layer having a minimum of 10 $\mu$m of thickness formed on single surface or both surfaces of said film by way of coating it (them) with fluoro-carbon resinous dispersion.

A method of producing a fluoro-carbon resinous laminate of improved surface property which is having a crack-resistant surface on a fluoro-carbon resinous layer thereof, comprises the following steps:

a step of coating single surface or both surfaces of a plastic film with fluoro-carbon resinous dispersion;

a step of drying said resinous dispersion; and a step of laminating fluoro-carbon resin by way of curing it with a highly raised atmospheric temperature in a thermal treating furnace.

Another method of producing a fluoro-carbon resinous laminate of the improved surface property comprises the following steps:

a step of coating single surface or both surfaces of a plastic film with fluoro-carbon resinous dispersion;

a step of drying said resinous dispersion; and a step of forming fluoro-carbon resinous layer having a minimum of 10 $\mu$m of thickness by way of curing said resinous dispersion in a thermal treating furnace with a highly raised atmospheric temperature.

Another method of producing a fluoro-carbon resinous laminate of the improved surface property comprises atmospheric temperature inside of said thermal treating furnace is preferably a minimum of 450° C. in the case of utilizing a hot-air oven and a minimum of 400° C. in the case of utilizing a far-infrared oven.

Another method of producing a fluoro-carbon resinous laminate of the improved surface property comprises the following steps:

a step of coating single surface or both surfaces of a plastic film with fluoro-carbon resinous dispersion added with organic solvent;

a step of drying said resinous dispersion; and a step of forming a fluoro-carbon resinous layer by way of curing said resinous dispersion in a thermal treating furnace.

Another method of producing a fluoro-carbon resinous laminate of the improved surface property comprises the following steps:

a step of coating single surface or both surfaces of a plastic film with fluoro-carbon resinous dispersion added with organic solvent;

a step of drying said resinous dispersion; and a step of forming a fluoro-carbon resinous layer having a minimum of 10 $\mu$m of thickness by way of curing said resinous dispersion in a thermal treating furnace.

Another method of producing a fluoro-carbon resinous laminate of the improved surface property comprises atmospheric temperature inside of said thermal treating furnace is a minimum of 350° C. in the case of utilizing a hot-air oven and a minimum of 300° C. in the case of utilizing a far-infrared oven.

Another method of producing a fluoro-carbon resinous laminate of the improved surface property comprises density of said fluoro-carbon resinous dispersion is a minimum of 30%.

Another fluoro-carbon resinous laminate of the improved surface property comprises main constituent of said fluoro-carbon resinous layer comprises one kind or two kinds or more than two kinds among tetrafluoroethylene resin, vinylidene fluoride resin, vinyl fluoride resin, copolymer comprising tetrafluoroethylene-hexafluoropropylene resin, copolymer comprising tetrafluoroethylene-perfluoroalkylvinylether resin, and copolymer comprising ethylene-tetrafluoroethylene resin.

Another method of producing a fluoro-carbon resinous laminate of the improved surface property comprises amount of organic solvent added to said resinous dispersion is in a range from 0.01% to 80%, against total solid content of fluoro-carbon resin.

Another method of producing a fluoro-carbon resinous laminate of the improved surface property comprises boiling point of said organic solvent is a minimum of 60° C.

Another method of producing a fluoro-carbon resinous laminate of the improved surface property comprises pyrolysis temperature of said plastic film is a minimum of 400° C.

Another method of producing a fluoro-carbon resinous laminate of the improved surface property comprises said plastic film is a polyimide film.

As was clarified above, the invention has embodied a method of producing a novel laminate comprising fluoro-carbon resinous layers formed on single surface or both surfaces of a plastic film via a coating method. Since the laminate is producible by coating said surface with fluoro-carbon resinous dispersion being cheaper in cost than fluoro-carbon resinous film, the fluoro-carbon resinous laminate can be produced at a lower cost than the one for conventional lamination method. More particularly, after coating said film surface with concentration-adjusted fluoro-carbon resinous dispersion (coating solution) and drying it, said dispersion is cured at a high temperature, or after coating said film surface with concentration-adjusted fluoro-carbon resinous dispersion added with organic solvent followed by a drying process and a curing process, laminate distinguished in appearance substantially being free of cracks on the surface of fluoro-carbon resinous layer can be produced. Accordingly, the fluoro-carbon resinous laminate produced by embodying the method related to the invention can be hoped for outstanding electrical reliability when being used for insulating electrical wires.

DETAILED DESCRIPTION OF THE INVENTION

Figure 1:
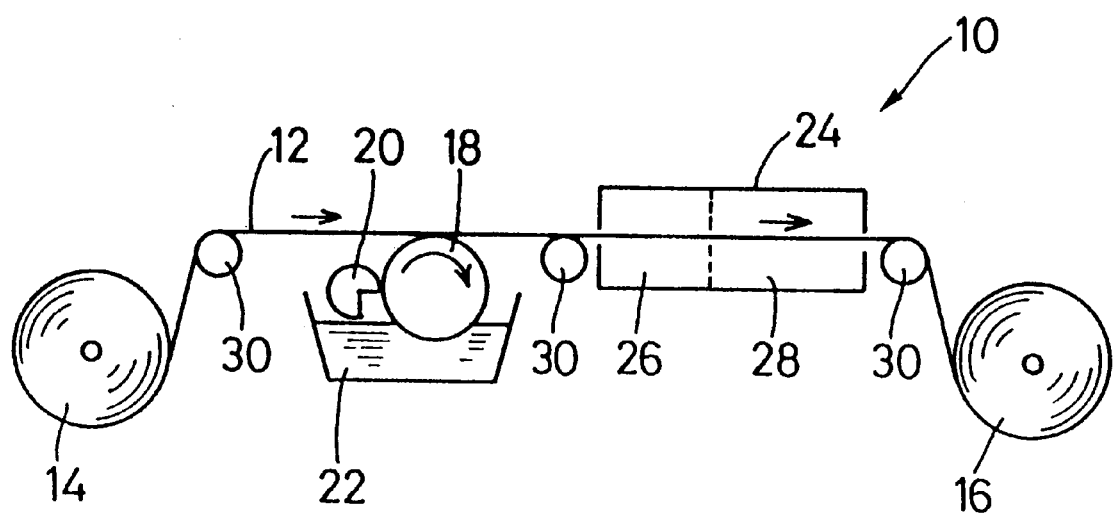
FIG. 1 is explanatory of an apparatus for embodying the method of producing fluoro-carbon resinous laminate of improved surface property related to the invention.

The fluoro-carbon resinous laminate of improved surface property related to the invention forms layers of fluoro-carbon resin by coating single surface or both surfaces of a plastic film with fluoro-carbon resinous dispersion. Notwithstanding that fluoro-carbon resinous layers are formed by coating method, noticeable cracks are invisible on the surface of the produced laminate to make it possible to embody the inventive method without generating any problems on appearance, thereby fluoro-carbon resinous laminate can easily be produced.

Concretely, in order to embody the inventive method, for example, such an apparatus 10 shown in FIG. 1 can be used. The apparatus 10 comprises the following: a film feed-out unit 14 for externally feeding a plastic film 12, a film winding unit 16 for winding a completed laminate thereon, a coater roll 18 for coating film surface with fluoro-carbon resinous dispersion, a doctor knife 20, a solution bath 22, and a heat treating furnace 24 for drying and curing film surface coated with fluoro-carbon resinous dispersion. The heat treating furnace 24 comprises a drying chamber 26 and a heating chamber 28 which is equipped with a hot-air oven for heating the resin-coated film surface with heated air and a far-infrared oven for heating said film surface with far-infrared-rays. The reference numeral 30 designates a free roll for enabling the film to smoothly run itself.

In the course of feeding the plastic film 12 out from the film feed-out unit 14 to the film winding unit 16, the plastic film 12 is coated with fluoro-carbon resinous dispersion (coating solution) by the coater roll 18 and then dried in the drying chamber 26.

Coating and drying conditions are not specifically restricted, and both conditions may properly be set according to experiences. Concretely, for example, using a gravure roll 80 serving as the coater roll 18, a film surface can properly be coated to eventually form a resinous layer having a minimum of 10 $\mu$m of thickness by applying 1 m/min. of line speed and 200 rpm of coater-roll rotating speed. When executing the drying process, the film surface is dried under a drying condition consisting of 100° C. for 2 minutes, for example.

There is no specific restriction on usable fluoro-carbon resin. However, it is desired that the following be used: tetrafluoroethylene resin, vinylidene fluoride resin, vinyl fluoride resin, tetrafluoroethylene-hexanefluoropropylene resin copolymer, tetrafluoroethylene-perfluoroalkylvinyl ether resin copolymer, and ethylene-tetrafluoroethylene resin copolymer. These can be used solely or plurally. In particular, it is preferred that usable fluoro-carbon resin be mainly composed of copolymer of tetrafluoroethylene/hexafluoropropylene (FEP), which is used after being adjusted into dispersion containing viscosity and density in accordance with applicable coating method.

When embodying the inventive production method, it is quite important to properly set density and viscosity of usable fluoro-carbon resinous dispersion. Using fluoro-carbon resinous dispersion having density in excess of 30%, preferably in excess of 35%, film surface can properly be coated with resinous layer having a minimum of 10 $\mu$m of thickness in particular.

Although there is no specific restriction on a plastic film used for embodying the invention, since it is essential that curing be executed at a high temperature, it is preferred that usable plastic film contains a minimum of 400° C. of pyrolysis temperature, thereby polyimide film can be exemplified for use. For example, such a polyimide film represented by General Formula (1) is preferred for use.

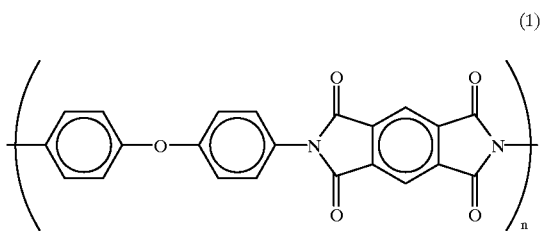

(1)

The polyimide film represented by the above General Formula (1) incorporates significantly distinguished thermal resistant property, long-term thermal resistant property, flame retarding property, and distinguished chemical resistant property, and yet, it is widely known that it also incorporates distinguished mechanical electrical characteristic in a broad temperature range.

In order to control thickness of coated resinous layer, not only concentration of the solid constituent of the fluoro-carbon resin of the fluoro-carbon resinous dispersion, but viscosity and coating method must also be taken into consideration. However, viscosity of coating solution is adequately adjustable according to coating method.

Conventionally, most of commercially available fluoro-carbon resinous dispersion contains a concentration of 30% through 60% of solid constituent of fluoro-carbon resin. Since said conventional fluoro-carbon resinous dispersions merely contain about 10 centipoises of viscosity, if it were spread on substrate via coating, dispersion flows itself to fail the effect of coating. Thus, in order to provide fluoro-carbon resinous dispersion with appropriate viscosity, it is essential that said dispersion be added with viscosity enhancing agent. To embody the invention, "Carbopol" 934 (a product of Goodrich Inc.) was used as a viscosity enhancing agent. It should be understood that available viscosity enhancer is not solely limited to said product.

Not only the gravure-applied method described earlier, but reverse roll method, air-doctor method, and blade-applying method are also applicable to film-surface coating with the viscosity-adjusted fluoro-carbon resinous dispersion. Although any of said coating methods may be executed, coating solution containing viscosity and concentration optimally adjusted for the introduced coating method is used.

After forming resinous layer via coating followed by a drying process, the resinous layer is hardened in the heating chamber 28 via curing. It is quite important that the above condition be optimized by properly setting temperature and duration of the curing process. In particular, by executing the curing process at a high temperature, such a fluoro-carbon resinous laminate free of problem on appearance can be produced. The heating chamber 28 may consist of a hot-air oven or a far-infrared oven. However, if the curing process were executed for a long while at a temperature above pyrolysis point of fluoro-carbon resin or a plastic film, there is fear of lowering physical characteristic caused by thermal degradation of resin such as degradation of heat-seal strength for example, and thus, it is quite important that attention be paid on the upper limit of the curing temperature and duration. Temperature and duration of the curing process is adequately set in correspondence with pyrolysis temperature of fluoro-carbon resin and a plastic film. Concretely, it is preferable that the atmospheric temperature in the heating chamber 28 is a minimum of 450° C. in the case of utilizing a hot-air oven, a minimum of 400° C. in the case of utilizing a far-infrared oven. Curing period of time is for 1 through 10 minutes, preferably for 1 through 5 minutes, more preferably for 1 through 3 minutes at 400° C. of curing temperature, and for 0.5 through 5 minutes, preferably for 0.5 through 3 minutes, more preferably for 0.5 through 1 minute at 450° C. of curing temperature. For example, in the case of laminating fluoro-carbon resin having 450° C. of pyrolysis temperature on single surface or both surfaces of a plastic film having 590° C. of pyrolysis temperature, it is desired that a curing process be executed for 1 through 3 minutes at 450° C. and 0.5 through 1 minute at 480° C.

In addition, the density-adjusted dispersion is added with organic solvent to enable production of fluoro-carbon resinous laminate according to the present invention without generating any cracks. It is desired that organic solvent be added to concentration-adjusted fluoro-carbon resinous dispersion by 0.01% through 80% against solid content of fluoro-carbon resin, desirably by 0.05% through 50%, preferably in a range from 0.1% through 35%. It is also desired that boiling point of addable organic solvent be a minimum of 60° C., desirably a minimum of 80° C., preferably a minimum of 100° C. By effect of using fluoro-carbon resinous dispersion added with the above-exemplified organic solvent, a film surface can eventually and properly be coated with resinous layer having a minimum of 10 μm of thickness.

Although there is no specific restriction on usable organic solvent, concretely, water-soluble organic solvent such as ethanol, DMF, NMP, or glycerine, is used solely or plurally in combination of two or more than two kinds. It is desired that boiling point of usable organic solvent be a minimum of 60° C., desirably a minimum of 80° C., and preferably a minimum of 100° C.

By effect of adding the above-suggested organic solvent having high boiling point, it is possible to spread range of evaporative temperature against evaporative constituent of the dispersion. It is thus inferred that generation of cracks on the surface of the FEP (tetrafluoroethylene/hexafluoropropylene copolymer) layer in dried condition can considerably be controlled in consequence. Furthermore, since generation of cracks on the surface of the FEP layer is suppressed after being dried, there is an advantage of being able to cure the FEP layer at a relatively low temperature. The above advantageous effects cannot be generated when being applied with any organic solvent having low boiling point.

In the case when organic solvent is added with fluoro-carbon resinous dispersion, a curing temperature in the heating chamber 28 can be set properly in a wade range, compared with the case when organic solvent is not added. A curing temperature is a minimum of 350° C. preferably a minimum of 400° C. in the case of utilizing a hot-air oven, and a minimum of 300° C., preferably a minimum of 350° C., more preferably a minimum of 400° C. in the case of utilizing a far-infrared oven. In addition, the fluoro-carbon resinous dispersion which is added with organic solvent can be cured by spending the same period of time at a temperature 50° C. lower than the case which organic solvent is not added. Consequently, compared with the case which organic solvent is not added, the fluoro-carbon resinous dispersion can be cured at a lower temperature by using the same short period of time. The fluoro-carbon resinous laminate according to the present invention can also be produced without generating any cracks by being cured under the same temperature conditions as the case which organic solvent is not added as the above described. When curing temperature is too high, there may be some cases which poisonous gas be generated from fluoro-carbon resin. Therefore, it is desirable to be cured at a low temperature in a short period of time.

The present invention enables the production of a fluoro-carbon resinous laminate, especially the production of a fluoro-carbon resinous laminate having a minimum thickness of 10 μm by coating which can hardly be thought of by conventional idea. For further details, a fluoro-carbon resinous laminate especially having a minimum thickness of 10 μm can be obtained by the following processes: treating conditions of the concentration control of fluoro-carbon resinous dispersion are optimized, a plastic film is coated with fluoro-carbon resinous dispersion, curing is performed at a high temperature, or organic solvent is added to thus enable curing at a comparatively low temperature to control generation of cracks. A fluoro-carbon resinous laminate not being visually turbid without serious cracks can be produced by the above production method. In addition, scraps in line and serious cracks are found on the whole of visually turbid laminate by the observation through a microscope, however, any scrapes as described above are hardly recognized on the laminate obtained by the production method according to the present invention, and few cracks are also found at a microscope level. Therefore, the appearance of the laminate is very preferable and quality such as electrical insulation thereof is also excellent.

As is apparent from the above description, according to the invention, such a fluoro-carbon resinous laminate having a minimum of 2 μm of thickness, desirably having a minimum of 5 μm of thickness, and preferably having a minimum of 10 μm of thickness can be produced in the state of satisfactory appearance and quality as a result of remarkable detering effect of crack generation.

Since the invention produces fluoro-carbon resinous laminate via coating with fluoro-carbon resinous dispersion being cheaper in cost than fluoro-carbon resinous film, and yet, since workable speed of coating process line can easily be promoted faster than lamination process, productive efficiency can also be promoted. Moreover, organic solvent is further added to fluoro-carbon resinous dispersion of concentration-adjusted, thus generation of cracks is prevented to enable the production of fluoro-carbon resinous laminate even at a comparatively low temperature. In consequence, cost of the fluoro-carbon resinous laminate produced by the inventive method can be lowered to a great extent compared with that of laminates produced via conventional lamination method.

Concrete examples of the novel method of producing a fluoro-carbon resinous laminate of improved surface property related to the invention have thus been described. It should be understood however that the scope of the invention is by no means limited to the above examples. It is also practicable to repeat coating of film surface with fluoro-carbon resinous dispersion and drying to eventually form fluoro-carbon resin by a minimum of 10 μm of thickness in particular before eventually hardening it via a curing process without entailing appearance problem as was described earlier. Concretely, there are following methods: a method of that curing is performed after coating with fluoro-carbon resinous dispersion and drying are performed and again coating and drying are performed, and a method of that after coating, drying and curing are performed, then again after coating, drying and curing are performed. When three or more than three kinds of fluoro-carbon resinous dispersion are used, both of the above two methods can be utilized in combination. It is also possible to perform coating several times by using the same kind of dispersion.

It is also practicable to produce such a laminate having resinous layers on both surfaces of film instead of forming such a laminate having resinous layer on single surface thereof as was described above. In this case, for example, both surfaces of the film are simultaneously coated with fluoro-carbon resinous dispersion and then dried. Alternatively, both surfaces of the film may be coated with said dispersion one after another and then dried before simultaneously curing both surfaces. As was mentioned above, after forming a laminate having a resinous layer on a single surface, another resinous layer can be formed on the other surface. In this way, the invention can be embodied by way of adding a variety of improvements, changes, and modifications, based on knowledges of those skilled in the art without deviating from essential scope thereof.

Referring now to practical examples, the invention is concretely described below. It should be understood however that the scope of the invention is not solely limited to the following examples. Boiling points of organic solvents used for the following examples are cited below: NMP 202° C., DMF 153° C., acetone 56° C., methanol 64.5° C., and glycerine 290° C.

EXAMPLE 1

Initially, 54.0 grams of pure water and 0.5 gram of "Carbopol" 934 (viscosity adjusting agent, a product of Goodrich Inc.) were respectively weighed and then stirred together for 15 minutes in a mixing unit. Next, 0.9 gram of aqueous ammonia (25~28% by weight) was added to the above solution and then stirred together for 2 minutes in said mixer. Next, the blend solution was added with 100 grams of fluoro-carbon resinous dispersion (ND-1, a product of Daikin Industrial Co., Ltd.) composed of aqueously dispersed copolymer comprising tetrafluoroethylene/hexafluoropropylene (FEP) and then blend solution was stirred together for 15 minutes, and finally fluoro-carbon resinous dispersion (coating solution) containing 35% concentration of the solid constituent of fluoro-carbon resin and 23.0 poises of viscosity was produced. Note that pyrolysis temperature of FEP is 480° C.

Next, using an apparatus shown in FIG. 1, single surface of a polyimide film having 25 μm of thickness ("APICAL" 25AH, a product and a registered trade name of Kanegafuchi Chemical Industrial Co., Ltd., having a minimum of 580° C. of pyrolysis temperature) was coated with the produced fluoro-carbon resinous dispersion in order that the FEP layer could have 12.5 μm of thickness in the solid form, and then the coated surface was dried. Next, the coated film surface was then cured at 450° C. of atmospheric temperature for 3 minutes in a hot-air oven, and finally a single-surface fluoro-carbon resinous laminate having 12.5 μm of thickness was produced. The apparatus was equipped with a gravure roll No. 80 which served as a coater roll and rotated at 200 rpm by running film at 1 meter/min. of line speed. Drying process was executed at 100° C. for 2 minutes. No crack was visually identified on the surface of fluoro-carbon resinous layer of the completed laminate. Process conditions and presence/absence of cracks are summarized in Table 1.

TABLE 1

|  | Resinous concentration (%) | Viscosity (poise) | Hot-Air oven | | |
|---|---|---|---|---|---|
|  |  |  | Treating temperature | Treating time | Cracks |
| Example 1 | 35 | 23.0 | 450° C. | 3 min. | No |
| Exam. 2 | 50 | 50.0 | 450° C. | 3 min. | No |
| Exam. 3 | 50 | 50.0 | 480° C. | 0.5 min. | No |
| Exam. 4 | 35 | 23.0 | 450° C. | 3 min. | No |
| Comp.Exam.1 | 30 | 20.0 | 450° C. | 3 min. | Yes |
| Comp.Exam.2 | 45 | 10.0 | 400° C. | 5 min. | Yes |
| Comp.exam.3 | 50 | 50.0 | 400° C. | 5 min. | Yes |

EXAMPLE 2

Except for formulating 6.0 grams of pure water, 0.27 gram of "Carbopol" 934 (a viscosity adjuster, a product of Goodrich Inc.), and 0.48 gram of aqueous ammonia (25%~28% by weight), in the same way as was done for Example 1, fluoro-carbon resinous dispersion (coating solution) containing 50% of resinous density and 50.0 poises of viscosity was produced. Using the produced fluoro-carbon resinous dispersion and based on process conditions identical to Example 1, a single-surface fluoro-carbon resinous laminate having 12.5 μm of thickness was produced. No crack was visually identified on the surface of fluoro-carbon resinous layer of the completed laminate. Process conditions and presence/absence of cracks are also summarized in Table 1.

EXAMPLE 3

Using fluoro-carbon resinous dispersion (containing 50% of resinous density) identical to that was used for Example 2, coating and drying processes were executed under the same conditions as Example 1. Next, a curing process was executed at 480° C. of atmospheric temperature for 0.5 minute in a hot-air oven, and finally a single-surface fluoro-carbon resinous laminate having 12.5 μm of thickness was produced. No crack was visually identified on the surface of fluoro-carbon resinous layer of the completed laminate. Process conditions and presence/absence of cracks are also summarized in Table 1.

EXAMPLE 4

Except for changing coating thickness of fluoro-carbon resinous dispersion and producing a single-surface fluoro-carbon resinous laminate having 5 μm of thickness, in the same way as was done for Example 1, a single-surface fluoro-carbon resinous laminate was produced. No crack was visually identified on the surface of fluoro-carbon resinous layer of the completed laminate. Process conditions and presence/absence of cracks are also summarized in Table 1.

COMPARATIVE EXAMPLE 1

Except for formulating 76.7 grams of pure water, 0.62 gram of "Carbopol" 934 (a viscosity adjusting agent, a product of Goodrich Inc.), and 1.11 gram of aqueous ammonia (25%~28% by weight), in the same way as was done for Example 1, fluoro-carbon resinous dispersion (coating solution) containing 30% of resinous concentration and 20.0 poises of viscosity was produced. Using the produced fluoro-carbon resinous dispersion and based on process conditions identical to Example 1, a single-surface fluoro-carbon resinous laminate having 12.5 μm of thickness was produced. However, the completed laminate was visually turbid, and yet, many visually recognizable conspicuous cracks were generated on the surface of the fluoro-carbon resinous layer. Process conditions and state of cracks are also summarized in Table 1.

COMPARATIVE EXAMPLE 2

Except for formulating 19.0 grams of pure water, 0.20 gram of "Carbopol" 934 (a viscosity adjusting agent, a product of Goodrich Inc.), and 0.36 gram of aqueous ammonia (25%~28% by weight), in the same way as was done for Example 1, fluoro-carbon resinous dispersion (coating solution) containing 45% of resinous concentration and 10.0 poises of viscosity was produced. Using the produced fluoro-carbon resinous dispersion based on process conditions identical to Example 1, coating and drying processes were executed. A curing process was then executed at 400° C. of atmospheric temperature for 5 minutes in a hot-air oven, and finally a single-surface fluoro-carbon resinous laminate having 12.5 μm of thickness was produced. The completed laminate was visually turbid, and yet, many visually recognizable conspicuous cracks were generated on the surface of the fluoro-carbon resinous layer. Process conditions and state of cracks are also summarized in Table 1.

COMPARATIVE EXAMPLE 3

Using fluoro-carbon resinous dispersion (containing 50% of resinous concentration) identical to that was used for Example 2, coating and drying processes were executed under the same conditions as Example 2. Next, a curing process was executed at 400° C. of atmospheric temperature for 5 minutes in a hot-air oven, and finally a single-surface fluoro-carbon resinous laminate having 12.5 μm of thickness was produced. The completed laminate was visually turbid, and yet, many visually recognizable conspicuous cracks were generated on the surface of the fluoro-carbon resinous layer. Process conditions and presence/absence of cracks are also summarized in Table 1.

EXAMPLE 5

Using fluoro-carbon resinous dispersion (containing 35% of resinous concentration) identical to that was used for Example 1, coating and drying processes were executed under the same conditions as Example 1. Next, a curing process was executed at 400° C. of atmospheric temperature for 5 minutes in a far-infrared oven, and finally a single-surface fluoro-carbon resinous laminate having 12.5 μm of thickness was produced. No crack was visually identified on the surface of fluoro-carbon resinous layer of the completed laminate. Process conditions and presence/absence of cracks are also summarized in Table 2.

TABLE 2

|  | Resinous concentration (%) | Viscosity (poise) | Far-infrared oven | | |
|---|---|---|---|---|---|
|  |  |  | Treating temperature | Treating time | Cracks |
| Exam. 5 | 35 | 23.0 | 400° C. | 5 min. | No |
| Exam. 6 | 50 | 50.0 | 450° C. | 1 min. | No |
| Exam. 7 | 50 | 50.0 | 480° C. | 0.5 min. | No |
| Comp.Exam.4 | 40 | 19.0 | 350° C. | 5 min. | Yes |

EXAMPLE 6

Using fluoro-carbon resinous dispersion (containing 50% of resinous concentration) identical to that was used for Example 2, coating and drying processes were executed under the same conditions as Example 1. Next, a curing process was executed at 450° C. of atmospheric temperature for 1 minute in a far-infrared oven, and finally a single-surface fluoro-carbon resinous laminate having 12.5 μm of thickness was produced. No crack was visually identified on the surface of fluoro-carbon resinous layer of the completed laminate. Process conditions and presence/absence of cracks are also summarized in Table 2.

EXAMPLE 7

Using fluoro-carbon resinous dispersion (containing 50% of resinous concentration) identical to that was used for Example 2, coating and drying processes were executed under the same conditions as Example 1. Next, a curing process was executed at 480° C. of atmospheric temperature for 0.5 minute in a far-infrared oven, and finally a single-surface fluoro-carbon resinous laminate having 12.5 μm of thickness was produced. No crack was visually identified on the surface of fluoro-carbon resinous layer of the completed laminate. Process conditions and presence/absence of cracks are also summarized in Table 2.

COMPARATIVE EXAMPLE 4

Except for formulating 32.5 grams of pure water, 0.40 gram of "Carbopol" 935 (a viscosity adjusting agent, a product of Goodrich Inc.), and 0.72 gram of aqueous ammonia (25%~28% by weight), in the same way as was done for Example 1, fluoro-carbon resinous dispersion (coating solution) containing 40% of resinous concentration and 19.0 poises of viscosity was produced. Using the produced fluoro-carbon resinous dispersion based on process conditions identical to Example 1, a coating and a drying processes were executed. A curing process was then executed at 350° C. of atmospheric temperature for 5 minutes in a far-infrared oven, and finally a single-surface fluoro-carbon resinous laminate having 12.5 μm of thickness was produced. The completed laminate was visually turbid, and yet, many visually recognizable conspicious cracks were generated on the surface of the fluoro-carbon resinous layer. Process conditions and state of cracks are summarized in Table 2.

EXAMPLE 8

Initially, 617.5 grams of pure water and 5.32 grams of "Carbopol" 934 (a viscosity adjusting agent, a product of Goodrich Inc.) were respectively weighed and then stirred together for 30 minutes in a mixing unit. The blend solution was then added with 9.50 grams of aqueous ammonia (25%~28% by weight) and then the solution was further stirred for 3 minutes in the mixing unit. Next, the blend solution was added with 1900 grams of fluoro-carbon resinous dispersion (ND-1, a product of Daikin Industrial Co., Ltd.) comprising aqueously dispersed copolymer of tetrafluoroethylene/hexafluoropropylene (FEP), and then further added with 50.5 grams of DMA. The blend solution was then stirred for 15 minutes, and finally fluoro-carbon resinous dispersion (coating solution) containing 5.0% by weight of organic solvent against solid content of fluoro-carbon resin, 40% of resinous concentration, and 2~3 poises of viscosity, was produced. Note that pyrolysis temperature of FEP is 480° C.

Next, using an apparatus shown in FIG. 1, single surface of a polyimide film having 25 μm of thickness ("APICAL" 25AH having a minimum of 580° C. of pyrolysis temperature, a product and a registered trade name of Kanegafuchi Chemical Industrial Co., Ltd.) was coated with the produced fluoro-carbon resinous dispersion in order that the FEP layer could have 15 μm of thickness in the solid form, and then the coated surface was dried at 100° C. for 1 minute. Next, a curing process was executed at 400° C. of atmospheric temperature for 3 minutes in a hot-air oven, and finally a single-surface fluoro-carbon resinous laminate having 15 μm of thickness was produced. The apparatus was equipped with a gravure roll No. 80 which served as a coater roll and rotated at 200 rpm by running film at 1 meter/min. of line speed. A drying process was executed by the apparatus at 100° C. for 2 minutes. No crack was visually identified on the surface of fluoro-carbon resinous layer of the completed laminate. Process conditions and presence/absence of cracks are summarized in Table 3.

TABLE 3

|  | Organic solvent to be added | Weight of O.S against solid content of FEP (%) | Concentration of FEP solution (%) | Thickness of FEP layer (μm) | Cracks |
| --- | --- | --- | --- | --- | --- |
| Exam. 8 | DMF | 5.0 | 40 | 15 | No |
| Exam. 9 | DMF | 17.3 | 40 | 15 | No |
| Exam. 10 | NMP | 5.0 | 40 | 15 | No |
| Exam. 11 | NMP | 17.3 | 40 | 15 | No |
| Exam. 12 | Glycerine | 5.0 | 40 | 15 | No |
| Exam. 13 | Glycerine | 17.3 | 40 | 15 | No |
| Co.Ex.5 | No | — | 40 | 15 | Many |
| Co.Ex.6 | No | — | 50 | 15 | Many |
| Co.Ex.7 | No | — | 30 | 15 | Many |
| Co.Ex.8 | No | — | 10 | 15 | Many |
| Co.Ex.9 | No | — | 40 | 5 | A few |
| Exam. 14 | Acetone | 5.0 | 40 | 15 | A few |
| Exam. 15 | Acetone | 17.3 | 40 | 15 | A few |
| Exam. 16 | Methanol | 5.0 | 40 | 15 | A few |
| Exam. 17 | Methanol | 17.3 | 40 | 15 | A few |
| Exam. 18 | DMF | 17.3 | 40 | 25 | No |
| Exam. 19 | DMF | 5.0 | 10 | 15 | No |
| Exam. 20 | DMF | 5.0 | 40 | 5 | No |

EXAMPLE 9

Except for formulating 177.3 grams of addable DMF, in the same way as was done for Example 8, fluoro-carbon resinous dispersion (coating solution) containing 17.3% by weight of organic solvent against solid content of fluoro-carbon resin, 40% of resinous concentration and 2~2.5 poises of viscosity, was produced. Next, using the produced fluoro-carbon resinous dispersion based on process conditions identical to Example 8, a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 3.

EXAMPLE 10

Except for formulating 50.5 grams of addable NMP, in the same way as was done for Example 8, fluoro-carbon resinous dispersion (coating solution) containing 5.0% by weight of organic solvent against solid content of fluoro-carbon resin, 40% of resinous concentration and 2~3 poises of viscosity, was produced. Next, using the produced fluoro-carbon resinous dispersion based on process conditions identical to Example 8, a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 3.

EXAMPLE 11

Except for formulating 177.3 grams of addable NMP, in the same way as was done for Example 8, fluoro-carbon resinous dispersion (coating solution) containing 17.3% by weight of organic solvent against solid content of fluoro-carbon resin, 40% of resinous concentration and 2~2.5 poises of viscosity, was produced. Next, using the produced fluoro-carbon resinous dispersion based on process conditions identical to Example 8, a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 3.

EXAMPLE 12

Except for formulating 50.5 grams of addable glycerine in the same way as was done for Example 8, fluoro-carbon resinous dispersion (coating solution) containing 5.0% by weight of organic solvent against solid content of fluoro-carbon resin, 40% of resinous concentration and 2~3 poises of viscosity, was produced. Next, using the produced fluoro-carbon resinous dispersion based on process conditions identical to Example 8, a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 3.

EXAMPLE 13

Except for formulating 177.3 grams of addable glycerine, in the same way as was done for Example 8, fluoro-carbon resinous dispersion (coating solution) containing 17.3% by weight of organic solvent against solid content of fluoro-carbon resin, 40% of resinous concentration and 2~2.5 poises of viscosity, was produced. Next, using the produced fluoro-carbon resinous dispersion based on process conditions identical to Example 8, a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 3.

COMPARATIVE EXAMPLE 5

Except for not adding organic solvent, in the same way as was done for Example 8, fluoro-carbon resinous dispersion (coating solution) containing 40% of resinous concentration and 3~4 poises of viscosity, was produced. Next, using the produced fluoro-carbon resinous dispersion based on process conditions identical to Example 8, a single-surface fluoro-carbon resinous laminate having 15 μm of thickness was produced. The completed laminate was visually turbid, and yet, many visually recognizable conspicuous cracks were generated on the surface of the fluoro-carbon resinous layer. Process conditions and presence/absence of cracks are also summarized in Table 3.

COMPARATIVE EXAMPLE 6

Initially, 60.0 grams of pure water and 18.5 grams of "Carbopol" 934 (a viscosity adjusting agent, a product of Goodrich Inc.) were respectively weighed and then stirred together for 30 minutes in a mixing unit. Next, the blend solution was added with 33.0 grams of aqueous ammonia (25%~28% by weight) and then stirred for 3 minutes. Next, the blend solution was further added with 1000 grams of fluoro-carbon resinous dispersion (ND-1, a product of Daikin Industrial Co., Ltd.) comprising aqueously dispersed copolymer of tetrafluoroethylene/hexafluoroethylene (FEP), and then the blend solution was further stirred for 30 minutes, and finally fluoro-carbon resinous dispersion (coating solution) containing 50% of resinous concentration and 60~70 poises of viscosity was produced. Using the produced fluoro-carbon resinous dispersion based on process conditions identical to Example 8, a single-surface fluoro-carbon resinous laminate having 15 μm of thickness was produced. The completed laminate was visually turbid, and yet, visually recognizable conspicuous cracks were generated on the surface of the fluoro-carbon resinous layer. Process conditions and state of cracks are also summarized in Table 3.

COMPARATIVE EXAMPLE 7

Initially, 767.0 grams of pure water and 6.2 grams of "Carbopol" 934 (a viscosity adjusting agent, a product of Goodrich Inc.) were respectively weighed and then stirred for 30 minutes in a mixing unit. The blend solution was further added with 11.1 grams of aqueous ammonia (25%~28% by weight) and then stirred together for 3 minutes. Next, the blend solution was added with 1000 grams of fluoro-carbon resinous dispersion (ND-1, a product of Daikin Industrial Co., Ltd.) comprising copolymer of tetrafluoroethylene/hexafluoroethylene (FEP) and then stirred together for 30 minutes, and finally fluoro-carbon resinous dispersion (coating solution) containing 30% of resinous concentration and 10 poises of viscosity was produced. Using the produced fluoro-carbon resinous dispersion and based on process conditions identical to Example 8, a single-surface fluoro-carbon resinous laminate having 15 μm of thickness was produced. However, the completed laminate was visually turbid, and yet, many visually recognizable conspicuous cracks were generated on the fluoro-carbon resinous layer. Process conditions and state of cracks are also summarized in Table 3.

COMPARATIVE EXAMPLE 8

Initially, 440.0 grams of pure water and 1.45 gram of "Carbopol" 934 (a viscosity adjusting agent, a product of Goodrich Inc.) were respectively weighed and then stirred together for 30 minutes in a mixing unit. Next, 2.61 grams of aqueous ammonia (25%~28% by weight) was added to the blend solution, and then the blend solution was further stirred for 3 minutes. Next, the blend solution was further added with 100 grams of fluoro-carbon resinous dispersion (ND-1, a product of Daikin Industrial Co., Ltd.) comprising aqueously dispersed copolymer of tetrafluoroethylene/hexafluoroethylene (FEP), and then the blend solution was stirred for 30 minutes, and finally fluoro-carbon resinous dispersion (coating solution) containing 10% of resinous concentration and 6~7 poises of viscosity was produced. Using the produced fluoro-carbon resinous dispersion and based on process conditions identical to that of Example 8, a single-surface fluoro-carbon resinous laminate having 15 μm of thickness was produced. However, the completed laminate was visually turbid, and yet, many visually recognizable conspicuous cracks were generated on the surface of the fluoro-carbon resinous layer. Process conditions and state of cracks are also summarized in Table 3.

COMPARATIVE EXAMPLE 9

Except for not adding organic solvent, in the same way as was done for Example 8, fluoro-carbon resinous dispersion (coating solution) containing 40% of resinous concentration and 3~4 poises of viscosity, was produced. Next, using the produced fluoro-carbon resinous dispersion based on process conditions identical to Example 8, a single-surface fluoro-carbon resinous laminate having 5 μm of thickness was produced. The completed laminate was visually turbid, and yet, a few visually recognizable conspicuous cracks were generated on the surface of the fluoro-carbon resinous layer. Process conditions and presence/absence of cracks are also summarized in Table 3.

EXAMPLE 14

Except for formulating 50.5 grams of addable acetone, in the same way as was done for Example 8, fluoro-carbon resinous dispersion (coating solution) containing 5% by weight of organic solvent against solid content of fluoro-carbon resin, 40% of resinous concentration and 2~2.5 poises of viscosity, was produced. Next, using the produced fluoro-carbon resinous dispersion based on process conditions identical to Example 8, a single-surface fluoro-carbon resinous laminate having 15 μm of thickness was produced. The completed laminate was visually a little turbid, and yet, a few visually recognizable conspicuous cracks were generated on the surface of the fluoro-carbon resinous layer. Process conditions and presence/absence of cracks are also summarized in Table 3.

EXAMPLE 15

Except for formulating 177.3 grams of addable acetone, in the same way as was done for Example 8, fluoro-carbon resinous dispersion (coating solution) containing 17.3% by weight of organic solvent against solid content of fluoro-carbon resin, 40% of resinous concentration and 2~2.5 poises of viscosity, was produced. Next, using the produced fluoro-carbon resinous dispersion based on process conditions identical to Example 8, a single-surface fluoro-carbon resinous laminate having 15 μm of thickness was produced. The completed laminate was visually a little turbid, and yet, a few visually recognizable conspicuous cracks were generated on the surface of the fluoro-carbon resinous layer. Process conditions and presence/absence of cracks are also summarized in Table 3.

EXAMPLE 16

Except for formulating 50.5 grams of addable methanol, in the same way as was done for Example 8, fluoro-carbon resinous dispersion (coating solution) containing 5.0% by weight of organic solvent against solid content of fluoro-carbon resin, 40% of resinous concentration and 2~2.5 poises of viscosity, was produced. Next, using the produced fluoro-carbon resinous dispersion based on process conditions identical to Example 8, a single-surface fluoro-carbon resinous laminate having 15 μm of thickness was produced. The completed laminate was visually a little turbid, and yet, a few visually recognizable conspicuous cracks were generated on the surface of the fluoro-carbon resinous layer. Process conditions and presence/absence of cracks are also summarized in Table 3.

EXAMPLE 17

Except for formulating 177.3 grams of addable methanol, in the same way as was done for Example 8, fluoro-carbon resinous dispersion (coating solution) containing 17.3% by weight of organic solvent against solid content of fluoro-carbon resin, 40% of resinous concentration and 2~2.5 poises of viscosity, was produced. Next, using the produced fluoro-carbon resinous dispersion based on process conditions identical to Example 8, a single-surface fluoro-carbon resinous laminate having 15 μm of thickness was produced. The completed laminate was visually a little turbid, and yet, a few visually recognizable conspicuous cracks were generated on the surface of the fluoro-carbon resinous layer. Process conditions and presence/absence of cracks are also summarized in Table 3.

EXAMPLE 18

Except for formulating 177.3 grams of addable DMF, in the same way as was done for Example 8, fluoro-carbon resinous dispersion (coating solution) containing 17.3% by weight of organic solvent against solid content of fluoro-carbon resin, 40% of resinous concentration and 2~2.5 poises of viscosity, was produced. Next, using the produced fluoro-carbon resinous dispersion based on process conditions identical to Example 8, a single-surface fluoro-carbon resinous laminate having 25 μm of thickness was produced. The completed laminate was visually a little turbid, and yet, a few visually recognizable conspicuous cracks were generated on the surface of the fluoro-carbon resinous layer. Process conditions and presence/absence of cracks are also summarized in Table 3.

EXAMPLE 19

Initially, 440.0 grams of pure water, 1.45 gram of "Carbopol" 934 (a viscosity adjusting agent, a product of Goodrich Inc.) were respectively weighed and then stirred together for 30 minutes in a mixing unit. Next, the blend solution was further added with 2.61 grams of aqueous ammonia (25%~28% by weight) and then stirred for 3 minutes. Next, the blend solution was further added with 100 grams of fluoro-carbon resinous dispersion (ND-1, a product of Daikin Industrial Co., Ltd.) comprising aqueously dispersed copolymer of tetrafluoroethylene/hexafluoroethylene and then stirred for 30 minutes. Next, the blend solution was further added with 2.7 grams of DMF and then stirred for 15 minutes and finally fluoro-carbon resinous dispersion containing 5.0% by weight of organic solvent against solid content of fluoro-carbon resin, 10% of resinous concentration, and 6~7 poises of viscosity. Using the produced fluoro-carbon resinous dispersion and based on process conditions identical to that of Example 8, a single-surface fluoro-carbon resinous laminate having 15 μm of thickness was produced. No crack was visually identified on the surface of the completed laminate. Process conditions and presence/absence of cracks are also summarized in Table 3.

EXAMPLE 20

Except for changing coating thickness of fluoro-carbon resinous dispersion and producing a single-surface fluoro-carbon resinous laminate having 5 μm of thickness, in the same way as was done for Example 8, a single-surface fluoro-carbon resinous laminate was produced. No crack was visually identified on the surface of fluoro-carbon resinous layer of the completed laminate. Process conditions and presence/absence of cracks are also summarized in Table 3.

EXAMPLE 21

Using fluoro-carbon resinous dispersion identical to that was used for Example 8, a drying process was executed at 100° C. for 1 minute. Next, a curing process was executed at 450° C. for 3 minutes in a hot-air oven, and finally a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 4.

TABLE 4

|  | Organic solvent to be added | Weight of O.S. against solid content of FEP (%) | Concentration of FEP solution (%) | Thickness of FEP layer (μm) | Cracks |
| --- | --- | --- | --- | --- | --- |
| Exam. 21 | DMF | 5.0 | 40 | 15 | No |
| Exam. 22 | DMF | 17.3 | 40 | 15 | No |
| Exam. 23 | NMP | 5.0 | 40 | 15 | No |
| Exam. 24 | NMP | 17.3 | 40 | 15 | No |

EXAMPLE 22

Using fluoro-carbon resinous dispersion identical to that was used for Example 9, a drying process was executed at 100° C. for 1 minute. Next, a curing process was executed at 450° C. for 3 minutes in a hot-air oven, and finally a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 4.

EXAMPLE 23

Using fluoro-carbon resinous dispersion identical to that was used for Example 8, a drying process was executed at 100° C. for 1 minute. Next, a curing process was executed at 400° C. for 3 minutes in a far-infrared oven, and finally a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 4.

EXAMPLE 24

Using fluoro-carbon resinous dispersion identical to that was used for Example 9, a drying process was executed at 100° C. for 1 minute. Next, a curing process was executed at 400° C. for 3 minutes in a far-infrared oven, and finally a single-surface fluoro-carbon resinous laminate having 15 μm of thickness was produced. No crack was visually identified on the surface of fluoro-carbon resinous layer of the completed laminate. Process conditions and presence/absence of cracks are also summarized in Table 4.

The above-referred Examples 1 through 7 and Comparative Examples 1 through 4 have respectively clarified that, in order to produce crack-free laminates, the concentration of the solid constituent of fluoro-carbon resin of fluoro-carbon resinous dispersion (coating solution) needs to be in excess of 30%, preferably in excess of 35%, and yet, curing temperature needs to be in excess of 450° C. inside of a hot-air oven and in excess of 400° C. inside of a far-infrared oven as a matter of great importance. It is also clear from the above-referred Examples that crack-free laminates can be produced by raising a curing temperature even when curing is executed for a short period of time. Considering degradation of physical characteristic caused by thermal degradation of resin generated by the curing process at a high temperature, it is preferred that curing should be executed in a shorter period of time. It is also apparent from Examples 8 through 20 and Comparative Examples 5 through 9 that, in the method of adding organic solvent, by virtue of adding organic solvent, even when deleting the curing process at a high temperature, effect for suppressing generation of cracks can be secured, and yet, it is also clear that higher the boiling point of organic solvent, the less the generation of crack. It is also apparent from Examples 21 through 24 that satisfactory fluoro-carbon resinous laminate free of mud crack can be produced by virtue of adding organic solvent and execution of curing process at a high temperature.

What is claimed is:

1. A fluoro-carbon resinous laminate having a crack-resistant surface on a fluoro-carbon resinous layer thereof, consisting essentially of:

a polyimide film substrate, wherein the polyimide film substrate has a minimum pyrolysis temperature of 400° C.; and a fluoro-carbon resinous layer of a minimum thickness of 10 μm having a crack-resistant surface on one surface or on both surfaces of said polyimide film substrate;

wherein said fluoro-carbon resinous layer is formed by:

coating said one surface or said both surfaces of said polyimide film substrate with a fluoro-carbon resinous dispersion comprising a fluoro-carbon resin in a concentration of more than 30% as a single layer, and curing in a hot air oven in which atmospheric temperature is raised to a minimum of 450° C. or in a far infra-red oven in which atmospheric temperature is raised to a minimum of 400° C.

2. The fluoro-carbon resinous laminate defined in claim 1, wherein said fluoro-carbon resinous coating layer comprises, as a main constituent:

at least one member selected from the group consisting of tetrafluoroethylene resin, vinylidene fluoride resin, vinyl fluoride resin, copolymer comprising tetrafluoroethylene-hexafluoropropylene resin, copolymer comprising tetrafluoromethylene-perfluoroalkylvinylether resin and copolymer comprising ethylene-tetrafluoroethylene resin.

3. A method of producing a fluoro-carbon resinous laminate having a crack-resistant surface on a fluoro-carbon resinous layer thereof, comprising:

coating a single surface or both surfaces of a polyimide film substrate with a fluoro-carbon resinous dispersion containing a minimum 30% concentration of fluoro-carbon resin;

drying said resinous dispersion;

curing said resinous dispersion in a hot air oven in which atmospheric temperature is raised to a minimum of 450° C.; and thereby forming a fluoro-carbon resinous layer having a minimum thickness of 10 μm.

4. A fluoro-carbon resinous laminate having a crack resistant surface on a fluoro-carbon resinous layer thereof formed by a process of claim 3.

5. A method of producing a fluoro-carbon resinous laminate having a crack-resistant surface on a fluoro-carbon resinous layer thereof, comprising:

coating a single surface or both surfaces of a polyimide film substrate with a fluoro-carbon resinous dispersion containing a minimum of 30% concentration of fluoro-carbon resin;

drying said resinous dispersion, curing said resinous dispersion in a far infra-red oven in which atmospheric temperature is raised to a minimum of 400° C., and thereby forming a fluoro-carbon resinous layer having a minimum thickness of 10 μm.

6. A method of producing a fluoro-carbon resinous laminate having a crack-resistant surface on a fluoro-carbon resinous layer thereof, comprising:

coating a single surface or both surfaces of a polyimide film substrate with a single layer of fluoro-carbon resinous dispersion, wherein said dispersion further contains an organic solvent, wherein the polyimide film substrate has a minimum pyrolysis temperature of 400° C. and the organic solvent has a boiling point of at least 80° C.;

drying said resinous dispersion;

curing said resinous dispersion in a hot air oven in which atmospheric temperature is raised to a minimum of 450° C. or in a far infra-red oven in which atmospheric temperature is raised to a minimum of 400° C.; and thereby forming a single fluoro-carbon resinous layer having a minimum thickness of 10 μm.

7. The method of producing a fluoro-carbon resinous laminate as defined in claim 6, wherein said fluoro-carbon resinous dispersion comprises fluoro-carbon resin in a concentration of 30% or more.

8. The method of producing a fluoro-carbon resinous laminate of improved surface defined in claim 6, wherein the amount of organic solvent contained in said resinous dispersion is in a range from 0.01% to 80% of total solid content of fluoro-carbon resin.

* * * * *